United States Patent [19]

Okano et al.

[11] Patent Number: 4,677,602

[45] Date of Patent: Jun. 30, 1987

[54] DEVICE FOR CONTROLLING RECORDING TRACK JUMP OPERATIONS WITH OVER-RUN CORRECTION

[75] Inventors: Takashi Okano; Tetsuo Akiyama, both of Saitama, Japan

[73] Assignee: Pioneer Electronic Corporation, Tokyo, Japan

[21] Appl. No.: 596,940

[22] Filed: Apr. 5, 1984

[30] Foreign Application Priority Data

Apr. 5, 1983 [JP] Japan .................................. 58-59822
Apr. 5, 1983 [JP] Japan .................................. 58-59823

[51] Int. Cl.⁴ ........................ G11B 7/013; G11B 7/09; G11B 21/08
[52] U.S. Cl. ..................................... 369/32; 369/33; 369/41; 369/44; 369/46
[58] Field of Search ....................... 369/32, 33, 41, 44, 369/46; 358/342; 360/78

[56] References Cited

U.S. PATENT DOCUMENTS 4,138,663 2/1979 Lehureau et al. ..................... 369/44

OTHER PUBLICATIONS

SMPTE Journal, Feb. 1977, vol. 86, pp. 80-83, Mathieu, "A Random Access System . . . ".

Primary Examiner—Raymond F. Cardillo
Assistant Examiner—Hoa T. Nguyen
Attorney, Agent, or Firm—Finnegan, Henderson, Farabow, Garrett and Dunner

[57] ABSTRACT

A device for controlling recording track jump operations includes a tracking servo loop which is activated when a data detecting point is traversed from an initial recording track on a recording disk to a target recording track. Circuitry is provided for accurate compensation in the event of overshooting the target recording track. A jump signal generating circuit may also be provided to reduce the frequency of generated traverse signals from a first frequency level to a second, lower frequency level when the data detecting point is a selected number of recording tracks away from the target recording track, or to gradually reduce the speed which the data detecting point traverses the recording tracks as the data detecting point moves from the initial recording track to the target recording track.

6 Claims, 47 Drawing Figures

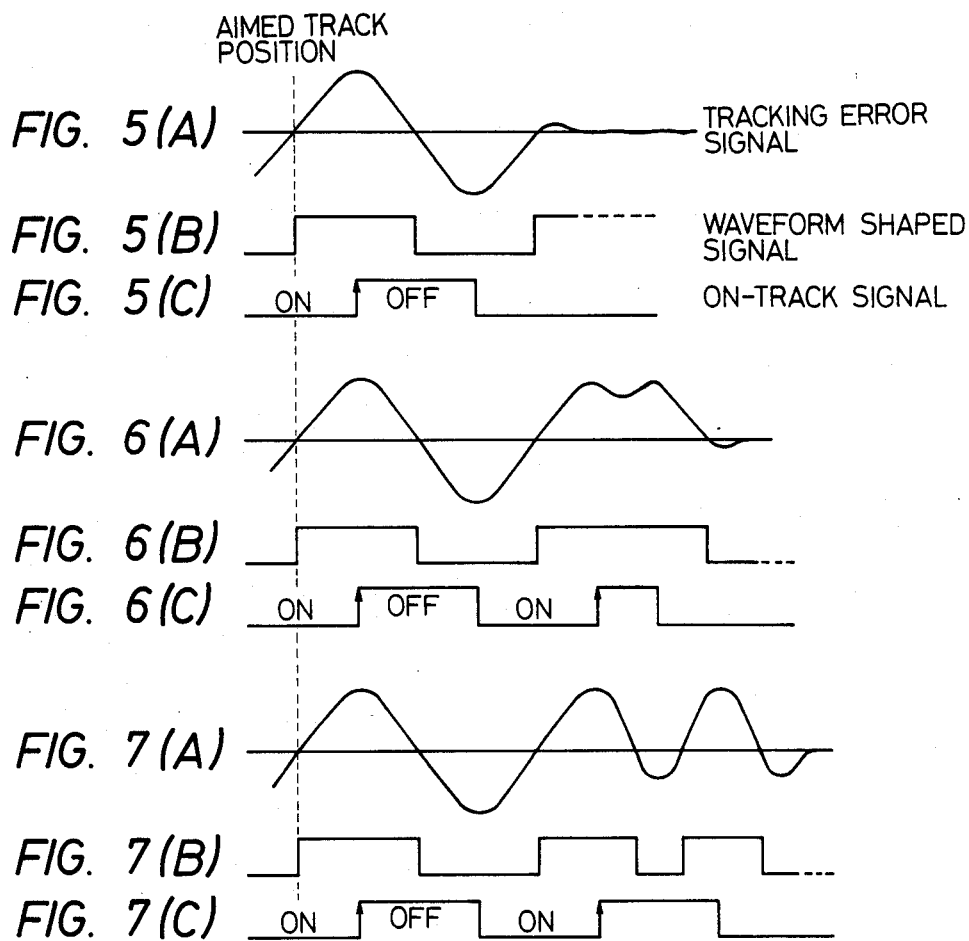
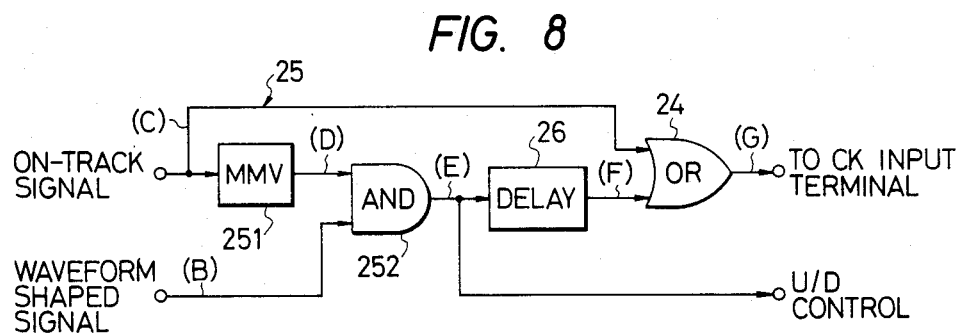

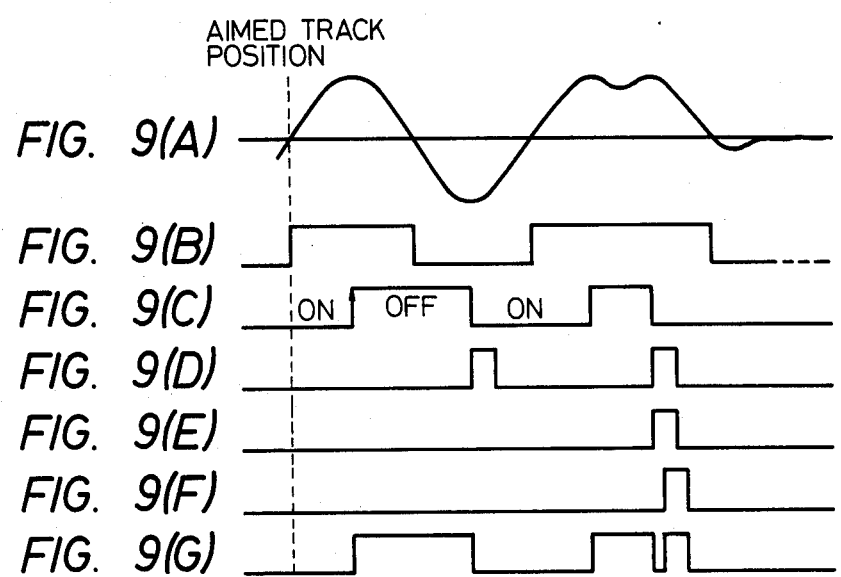

DEVICE FOR CONTROLLING RECORDING TRACK JUMP OPERATIONS WITH OVER-RUN CORRECTION

FIELD OF THE INVENTION

The present invention relates to a device for controlling a jump operation of recording tracks for use in a recorded data reproducing device.

BACKGROUND OF THE INVENTION

In a recorded data reproducing device, a jumping operation needs to be carried out so that a detecting point of recorded data on a recording track is consecutively jumped from a track currently being read to another aimed track.

FIG. 1 shows a block diagram of a prior art circuit which operates to perform such a jumping operation. In the figure, reference numeral 1 denotes a part of a recording track. When the center of a data detecting light spot 2 is on focused on the center of the track, the centers of the tracking light spots 3 and 4 are positioned on both side edges of the track. Accordingly, if the center of the data detecting light spot 2 is displaced from the center of the track 1, a difference occurs in the light received from the tracking light spots 3 and 4. The polarity of the difference thereof is varied according to an amount of displacement and its direction.

A tracking servo signal (B) is obtained from the output of a differential amplifier 7 the inputs of which correspond to the light received from the light spots 3 and 4. The servo signal (B) is applied through a loop switch 8 to an equalizer amplifier (EQ) 9 where the servo signal is subjected to phase compensation. The compensated signal is then applied through an adder 10 to an input of a driving amplifier 11. In response to the output of the driving amplifier 11, a driving coil 13 is energized to actuate a tracking mirror 12 to rotate in a direction orthogonal to the recording track 1. In this manner, the data detecting light spot 2 is controlled to track the recording track accurately during reproduction. In this manner a servo loop is operated.

The servo signal (B) is also applied to a waveform shaping circuit 14 where the signal is subjected to waveform shaping to produce pulse signals (C). The signals (C) are in turn supplied to a forward/reverse switching circuit 15. The switching circuit 15 operates to invert the phase of the pulse signals (C) in response to a forward/reverse reproduction instruction supplied from a forward/reverse instruction circuit 19. Reversal of the phase of the pulse signals is needed for the following reason. Since the phase of the servo signal is different by 180° between the forward and reverse directions of the movement of the light spot, it is necessary to coincide the phase of the signals at both when the light spot is shifted to the right and to the left relative to the track. The output pulses of the forward/reverse switching circuit 15 are applied as clock inputs (CK) to an N-th counter 16. This counter starts counting in response to a jump instruction signal supplied from an operation unit 18.

The counter is constructed so that the counting control is effectuated by an external control signal and the number to be counted can be thereby varied. A high level signal (D) is generated by the counter 16 continuously for the period beginning when the counter is set until N pulses are received and counted. In response to the signal (D), the loop switch 8 is controlled and a jump signal generating circuit 17 is enabled to produce a jump signal. This jump signal is inputted to the adder 10 to energize the mirror drive coil 13. The application of a signal from the forward/reverse instruction signal generator 19 to the jump signal producing circuit 17 causes the jump signal to be generated in accordance with the polarity corresponding to the forward and reverse directions.

FIGS. 2(A) through 2(D) show waveforms of the signals (A) through (D) as indicated in FIG. 1 corresponding to the initial condition of the tracking servo loop switch 8 being in the closed condition and the circuit reproducing while the tracking servo is normally operated. In this condition, if the jump instruction signal as indicated in FIG. 2(A) is received from the operation unit 18, the N-th counter 16 is reset in response thereto and the counter output (D) is raised to a high level as shown in FIG. 2(D). This opens the loop switch 8. The jump signal containing a polarity instruction corresponding to the reproducing direction of forward or reverse is outputted from the jump signal generating circuit 17. By this jump signal, the tracking mirror 12 is forcibly rotated so that the data detecting light spot is caused to jump onto an adjacent track from the current track.

As a result, the output of the differential amplifier 7 produces signals as shown in FIG. 2(B), and the waveform shaping circuit 14 outputs pulse signals as shown in FIG. 2(C). The latter pulse signals are fed to the clock input CK of the N-th counter 16 and the number of pulses fed thereto are counted. Upon completion of counting N pulses, the output (D) of the counter 16 goes to a low level, thereby closing the servo loop switch 8 and ceasing the production of the drive signal. Thereafter, the reproducing operation is initiated.

Counting N pulses by the counter 16 indicates that the light spot 2 has jumped N tracks at once. Therefore, by effecting the count control in accordance with the external instruction, jumping of a desired number of tracks can again be carried out.

The above-described prior art circuit arrangement is disadvantageous in that, if the data detecting point does not accurately jump onto the aimed recording track, an over-run phenomenon occurs which is not detected. Therefore, the data detecting point cannot accurately track the aimed track.

SUMMARY OF THE INVENTION

Accordingly, an object of the present invention is to provide a recording track jump controlling device which is capable of accurately detecting an over-run phenomenon, which occurred during a jumping operation and for quickly moving a data detecting point onto an aimed recording track.

Briefly, and in accordance with the invention, a tracking servo loop is opened in response to a jump instruction signal and the data detecting point is made to jump over a predetermined number of the recording tracks. The feature of the invention resides in the provision of means for generating a difference signal of the predetermined number of tracks and a count number obtained by counting the number of occurences of a prescribed signal generated every traversing of the recording tracks by the data detecting point; means for detecting a reversal of a direction which the data detecting spot traverses the recording tracks and for generating a quasi-signal analoqous to the prescribed signal;

means for reversely effecting the counting of the number of occurrences of the prescribed signal; and means for controlling the jump operation of the data detecting point in response to the difference signal.

BRIEF DESCRIPTION OF THE DRAWINGS

FIGS. 5(A), 5(B) and 5(C) show different signals generated by the circuit in FIG. 3 when the data detecting point takes the path shown by locus a in FIG. 4(A);

FIGS. 6(A), 6(B) and 6(C) show the different signals generated by the circuit in FIG. 3 when the data detecting point follows the path defined by locus b in FIG. 4(A);

FIGS. 7(A), 7(B) and 7(C) show signals generated by the circuit in FIG. 3 when the data detecting point takes the path shown by locus c shown in FIG. 4(A);

FIG. 8 is a circuit diagram showing a part of the circuit in FIG. 3;

FIGS. 9(A) through 9(G) are waveform diagrams illustrating the operation of the circuit of FIG. 8;

DETAILED DESCRIPTION OF THE PREFERRED EMBODIMENTS

Preferred embodiments according to the present invention will now be described with reference to the accompanying drawings.

Figure 1:
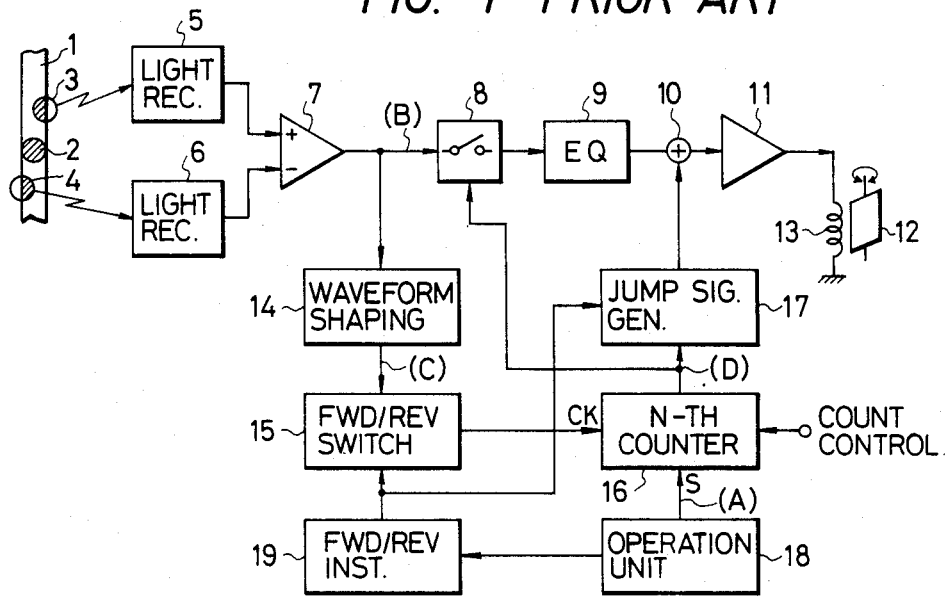
FIG. 1 is a circuit block diagram illustrating a prior art jump controlling method.
Figure 2A:
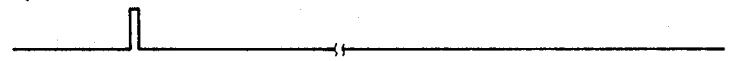
FIGS. 2(A) through 2(D) are waveform diagrams illustrating the operation of the circuit of FIG. 1.
Figure 2B:
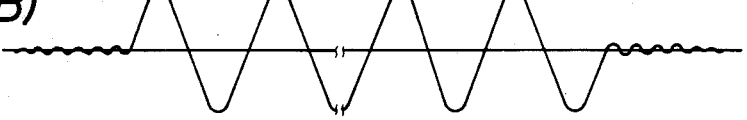
Figure 2C:
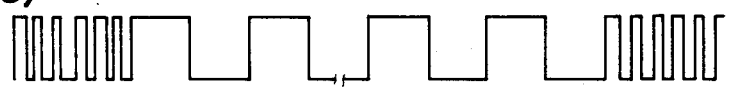
Figure 2D:
Figure 3:
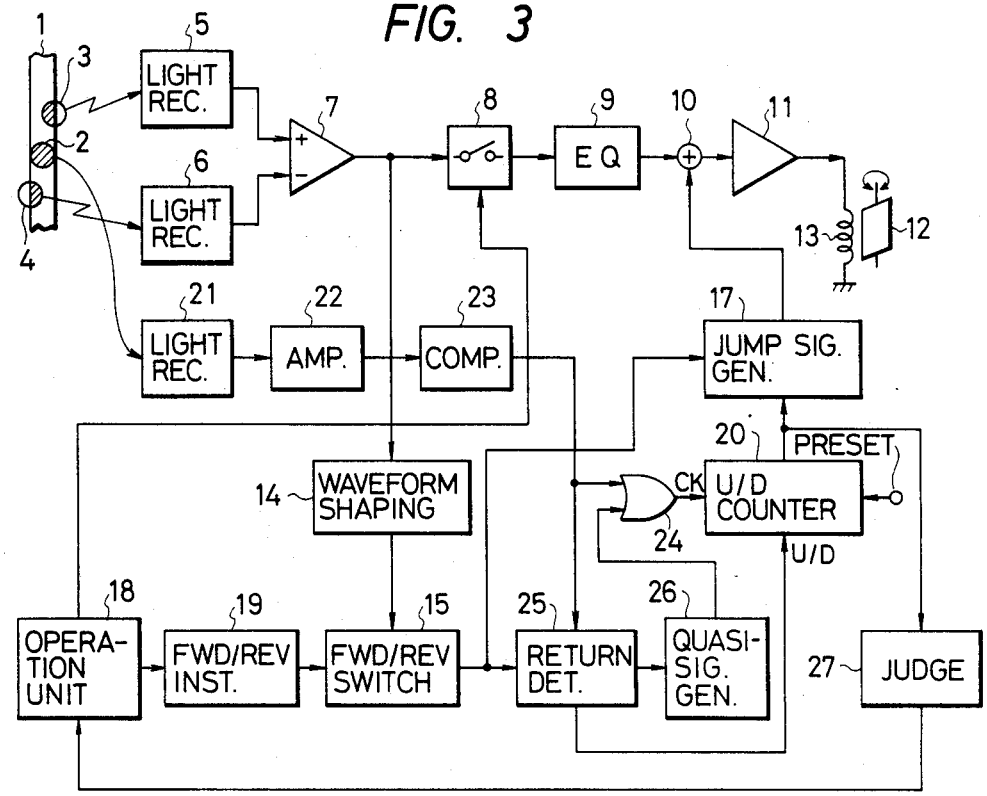
FIG. 3 is a circuit block diagram showing a first embodiment according to the present invention.

FIG. 3 shows a block diagram of a first embodiment of the present inventin in which like reference numerals denote like components or elements shown in FIG. 1. Description of those components is omitted herein. In this embodiment, a freely presettable up/down counter 20 is employed and a preset value of the counter indicates the number of tracks to be jumped. The clock input CK of the counter 20 receives a signal which is generated every time the data detecting point traverses a recording track. Such a signal is obtained as follows. The reflected light of the data detecting light spot 2 is received in a light receiving element 21 and the received signal is applied to a low-range amplifier 22 from which an envelope signal of high frequency (HF) component is derived. The envelope signal is applied to a level comparator 23 where it is compared with, for example, a zero level. From the level comparator 23, an on-track signal is produced. The on-track signal is such that a low level thereof indicates that the information detecting point 2 is on a recording track while a high level indicates that the information detecting point is outside of recording track. The on-track signal is applied through an OR gate 24 to the counter 20 as a counting input. The counter 20 implements counting in response to, for example, a rising edge of the on-track signal.

A return detector 25 is provided which detects an inversion in the direction of the movement of the light detecting spot which occurs when the data detecting point 2 traverses the recording tracks in the reverse direction. The operation of the return detector 25 is implemented based upon the signal having passed through the wavefrom shaping circuit 14 and the forward/reverse switching circuit 15 and also upon the on-track signal. When the direction of movement of the data detecting point is reversed, a detection signal is outputted from the return detector 25. In response to the detection signal, the counter 20 which has been in down-counting state is switched to the up-counting condition. In addition, a quasi-signal generator 26 connected to the output of the return detector 25 is operated so that a quasi-on-track signal is generated therefrom and is applied to the count input of the counter 20 through the OR gate 24.

During a period when the count value in the counter is reset to zero, a jump signal is produced from a jump signal generating circuit 17. On the other hand, the content of the counter 20 is procesed by a count content judging circuit 27, and according to the results thereof a forward/reverse instruction generating circuit 19 is controlled through an operation circuit 18.

In the above-described arrangement, when a predetermined number of tracks are to be jumped, the counter 20 is preset to the predetermined value and either a forward or reverse direction jump instruction is issued. When an address of an aimed track is designated, the difference between the aimed track's address and the current position address is computed. Then, a direction and the predetermined value is preset in the counter by a preset means (not shown) corresponding to the computed difference being positive or negative and the absolute value of the difference. Alternatively, when the direction and the number of tracks to be jumped are known, the counter is set in accordance therewith.

In response to the jump signal, the loop switch 8 is opened and the jump signal of a certain polarity is outputted from the jump signal generating circuit 17 to implement the jumping operation. During the jumping operation, the on-track signal, which is the output of the comparator 23, is level-shifted from low to high in synchronism with the timing with which the data detecting point traverses the tracks. Therefore, the number of occurrences of the level shifting is counted down in the counter 20. When the count value of the counter becomes zero, the count content judging circuit 27 detects the count value being zero and the loop switch 8 is closed by the operation unit 18. As a result, the servo loop is closed and a normal tracking operation is carried out.

The foregoing description is directed to the case where no over-run phenomenon occurs. The circuit operates as follows if an over-run occurs, e.g., the data detecting point over-runs the aimed track by one track. Assuming that the counter 20 is of the eight-column binary type and that the number of tracks to be jumped is 100, the preset value of the counter is "01100100". As a result of one-track over-run, the content of the count value becomes "11111111". The count content judging circuit 27 then determines that the number of tracks over-ran is one (1). This judgment can be made by obtaining the two's complement of the counter content. More specifically, since the two's complement of "11111111" is "00000001", it can be determined that the number of over-run tracks is one (1).

As a result, a reverse direction jump needs to be performed for this over-run track number. Hence, the latter number is again preset to the counter 20 and a similar jumping operation is repeated.

Figures 4A, 4B, 4C:
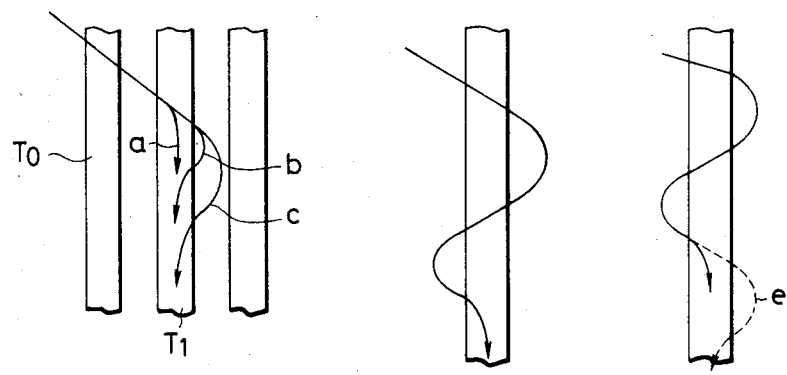
FIG. 4(A), 4(B), and 4(C) show possible paths a data detecting point can take when it over-runs an aimed track.

Three patterns of the above-described over-run are illustrated in FIG. 4(A) in which the data detecting point over-runs the aimed track $T_0$ by one track and enters into the adjacent track $T_1$ along the loci a, b and c. The waveforms of the track error signal, the output signal of the waveform shaping circuit 14, and the on-track signal corresponding to each of the loci a, b and c are illustrated in FIGS. 5(A), 5(B) and 5(C), FIGS. 6(A), 6(B) and 6(C) and FIGS. 7(A), 7(B) and 7(C), respectively.

In the case of the locus a, the waveforms of the respective signals are shown in FIGS. 5(A), 5(B) and 5(C). The on-track signal is raised to a high level concurrent with the passing of the aimed track $T_0$ by the data detecting point. In response to the rising edge of the on-track signal, the counter correctly indicates that one-track overrun has occurred. Therefore, no problem is involved in the case when the data detecting point goes along the locus a. However, problems occur in the case where the data detecting point traverses the adjacent track $T_1$ of the aimed track $T_0$ once and then returns to the track $T_1$ as is the case with loci b and c. In such cases, as indicated in FIGS. 6(C) and 7(C), the on-track signals are raised to high when traversing the track $T_1$. Due to this rising edge of the on-track signal, the counter 20 is down-counted as a result of which the count value becomes "11111110". That is, the counter erroneously indicates that two-track over-run has occurred.

In order to resolve such a problem, the return detector 25 and the quasi-signal generator 26 are provided. A specific circuit diagram of the return detector 25 and the quasi-signal generator 26 is shown in FIG. 8 in which the output (B) of the waveform shaping circuit 14 (see FIG. 3) is applied to one input of two-input AND gate 252. The on-track signal (C) is applied as a trigger input to a monostable multivibrator (MMV) 251 and the output of the latter is applied to the other input of the AND gate 252. In response to the output (E) of the AND gate 252, up/down controlling of the counter 20 is effectuated. The output (E) of the AND gate 252, after passing through a delay circuit 26 (which is the quasi-signal generator), is used as the quasi-signal (F) of the on-track signal. The signal (F) and the on-track signal (C) are the inputs to the OR gate 24 and the output of the OR gate 24 is applied as the clock input (G) to the counter 20.

FIGS. 9(A) through 9(G) indicate the various waveforms for description of the operation of the circuit shown in FIG. 8. The waveforms shown in FIGS. 9(B) through 9(G) correspond to the signals (B) through (G) indicated in FIG. 8. The waveform shown in FIG. 9(A) indicates the tracking error signal in the case of locus b in FIG. 4(A). A similar waveform is drawn in the case of locus c.

As in the case of the loci of b and c, when the data detecting point reversely traverses the track and reenters the track $T_1$, there exists a time period when both the output (D) of the monostable multivibrator 251 which is triggered in response to the falling edge of the on-track signal (C) and the tracking error signal are in high level which at a turn is detected by the AND gate 252, thereby obtaining a gate output (E). During the period when the gate output (E) is at a high level, the counting direction of the counter 20 is controlled so as to change from the down-counting to the up-counting state. The gate output (E) is delayed by a predetermined time by means of the delay circuit 26 to produce the quasi-signal. The rising edge of the quasi-signal is set to occur during the up-counting period of the counter 20, so that the counter 20 effects up-counting in response to the quasi-signal. Therefore, the counter indicates one (1) as the number of over-run. It should be noted that the counter is capable of counting more than one (1) as the number of over-run tracks.

Description has been given in the case of one track error detection and one skilled in the art would readily understand that the invention is applicable for detection of more than two tracks' error (see FIGS. 4(B) and 4(C)).

Figure 10:
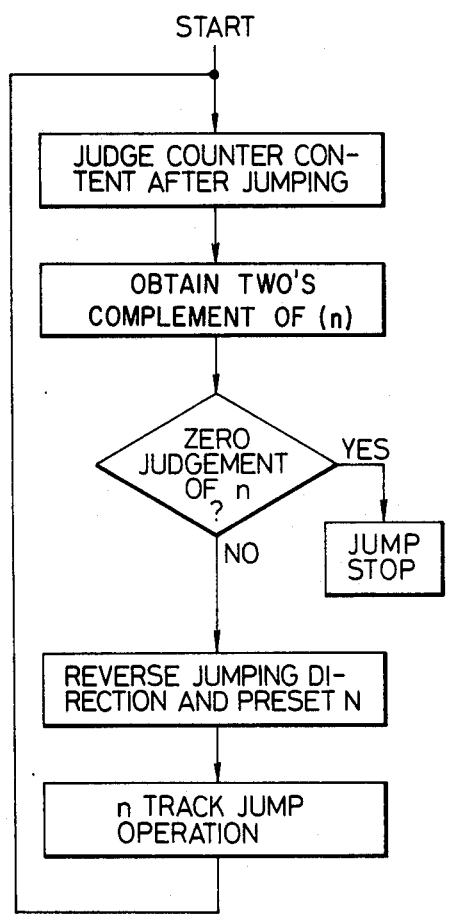
FIGS. 10 and 11 are flow charts for description of the sequence of the operations of the circuit of FIG. 3.
Figure 11:
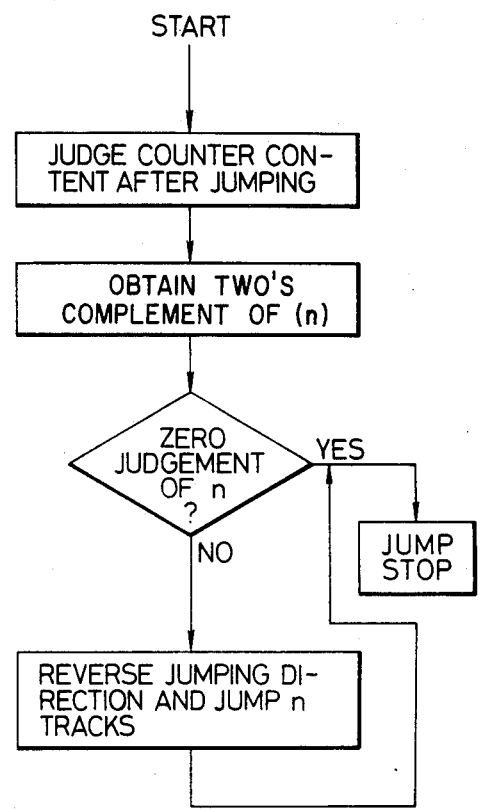

FIGS. 10 and 11 are flow charts illustrating the sequences of operations when are executed, upon detecting the number of over-run tracks by the counter 20, up to a time when a jumping correction onto the aimed track has been completed. FIG. 10 illustrates the cases when the jumping operation is carried out at one time for the amount depending upon the difference in the track numbers between the aimed track and a track to which the data detecting point is locked in as a result of over-run. In the case of FIG. 11, on the other hand, the jumping operation is repeatedly carried out one track by one track for the total number of tracks to be jumped.

As described, according to the first embodiment of the invention, the number of over-run tracks can be accurately detected and jumping onto the aimed track can be adequately performed. In searching for the aimed track, it is, therefore, not necessary to provide coarse and fine adjustment means independently, whereby the circuit arrangement can be simplified and further quick search operation can be accomplished. While the advantages as mentioned above are obtainable in the FIG. 3 embodiment, a problem arises when the jumping distance of the data detecting point is long. The velocity of the moving data detecting point relative to the recording track may vary due to eccentricity of the recording disk, so that the time required for jumping varies and the lock-in operation of the track servo after the jumping operation is terminated becomes unstable.

Figure 12:
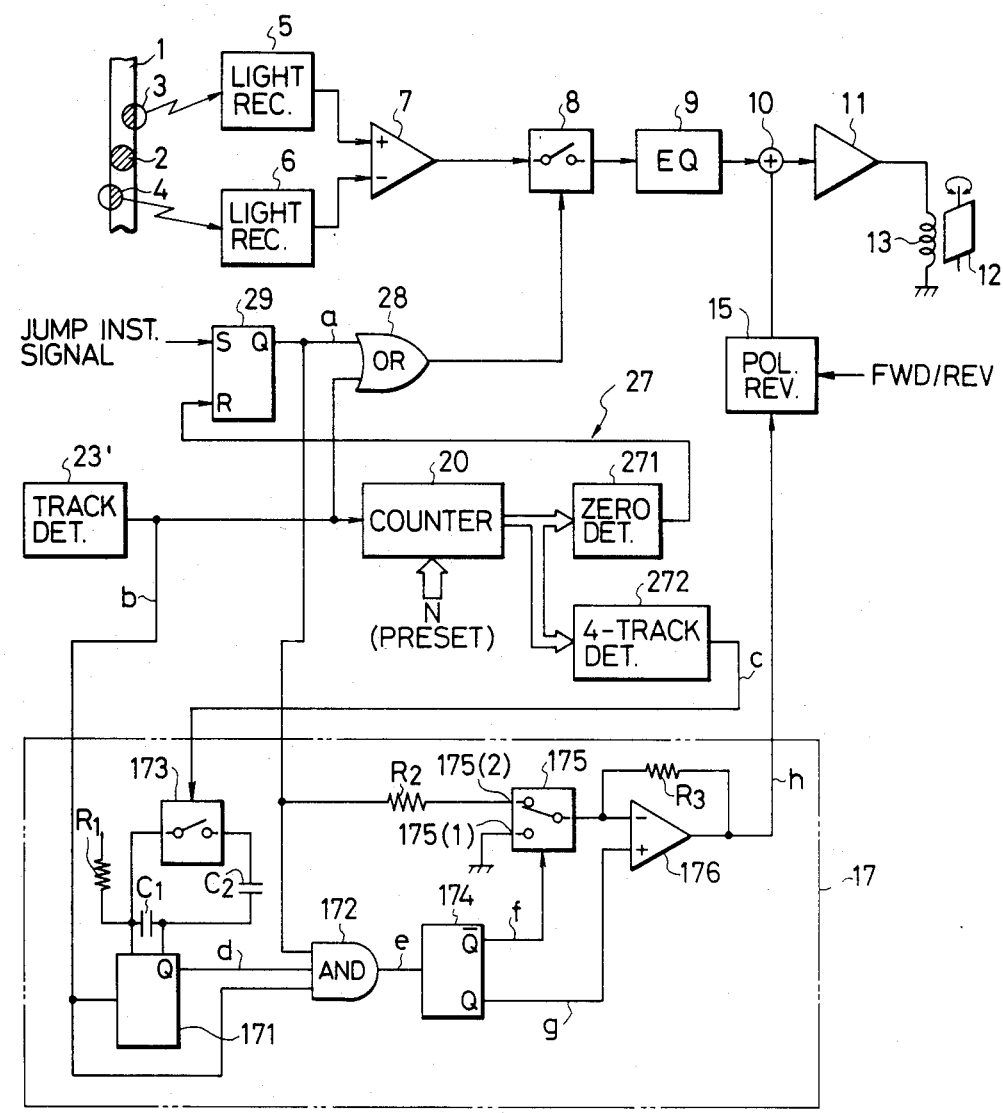
FIG. 12 is a circuit block diagram showing a controlling device for controlling the relative velocity of a data detecting point, which device is suitable if used in conjunction with the embodiments of the invention.

FIG. 12 is a block diagram showing a modified embodiment of FIG. 3 in which a stable servo lock-in is ensured while controlling the relative velocity of the data detecting point during the jumping operation. In FIG. 12, like reference numerals denote like components for elements shown in FIG. 3. To the control input of the loop switch 8, the Q output (a) of an R-S flip-flop 29 and the output (b) of a track detector 23 are supplied through an OR gate 28. The track detector 23 corresponds to the comparator 23 shown in FIG. 3 and operates to produce the on-track signal (b). To the reset input of the flip-flop 29, a jumping instruction signal issued from the operation unit 18 is applied.

The on-track signal (b) is applied as a counting input to the up/down counter 20 and the jump signal generating circuit 17. The output of the counter 20 is supplied to a zero detection circuit 271 and a four-track detection circuit 272, both constituting the counter content judging circuit 27. The zero detection circuit 271 produces a zero detection signal with, for example, a high level when the counter content becomes zero. The output of the zero detection signal is fed to the reset input terminal of the R-S flip-flop 29. The four-track detection circuit 272 produces a four-track detection signal (c) with, for example, a high level when the counter content becomes less than four (4). The output of the four-track detection signal (c) is fed to the jump signal generating circuit 17.

In the jump signal generating circuit 17, the output (b) of the track detector 23 is applied to both the trigger input terminal of a monostable multivibrator 171 and one input terminal of a three-input AND gate 172. The remaining two input terminals of the three-input AND gate 172 receive the Q output (d) of the multivibrator 171 and the Q output, i.e. the signal (a) of the R-S flip-flop 29. Between a resistor $R_1$ and a capacitor $C_1$, which serve to time limit the multivibrator 171, an analog switch 173 and a capacitor $C_2$ are connected in series. The analog switch 173 is closed when a high signal level is supplied to its control input terminal by the four-track detection signal (c).

The output (e) of the three-input AND gate 172 is supplied to the trigger input terminal of a monostable multivibrator 172. The output (f) of the multivibrator 174 is supplied to the control input terminal of a change-over switch 175. A first input terminal 175(1) of the change-over switch 175 is connected to ground. To a second input terminal 175(2) of the change-over switch 175, the Q output, i.e., the signal (a), of the R-S flip-flop 29 is supplied through a resistor $R_2$.

When a low level signal is applied to the control input of the change-over switch 175, a signal on the first input terminal 175(1) is supplied as the output of the change-over switch 175. When a high level signal is applied to the control input thereof, the signal on the second input terminal 175(2) is supplied as an output thereof.

The signal outputted from the change-over switch 175 is applied to an inverting input terminal of an operational amplifier 176. To the non-inverting input thereof, the Q output (g) of the multivibrator 174 is applied. A feedback resistor $R_3$ is connected between the inverting input terminal and the output terminal of the operational amplifier 176. The output of the operational amplifier 176 is supplied as the jump signal (h) to the adder 10 through a polarity unit 15. The latter unit 15 reverses the polarity of the jump signal (h) in accordance with the forward/reverse reproduction instruction.

Figure 13:
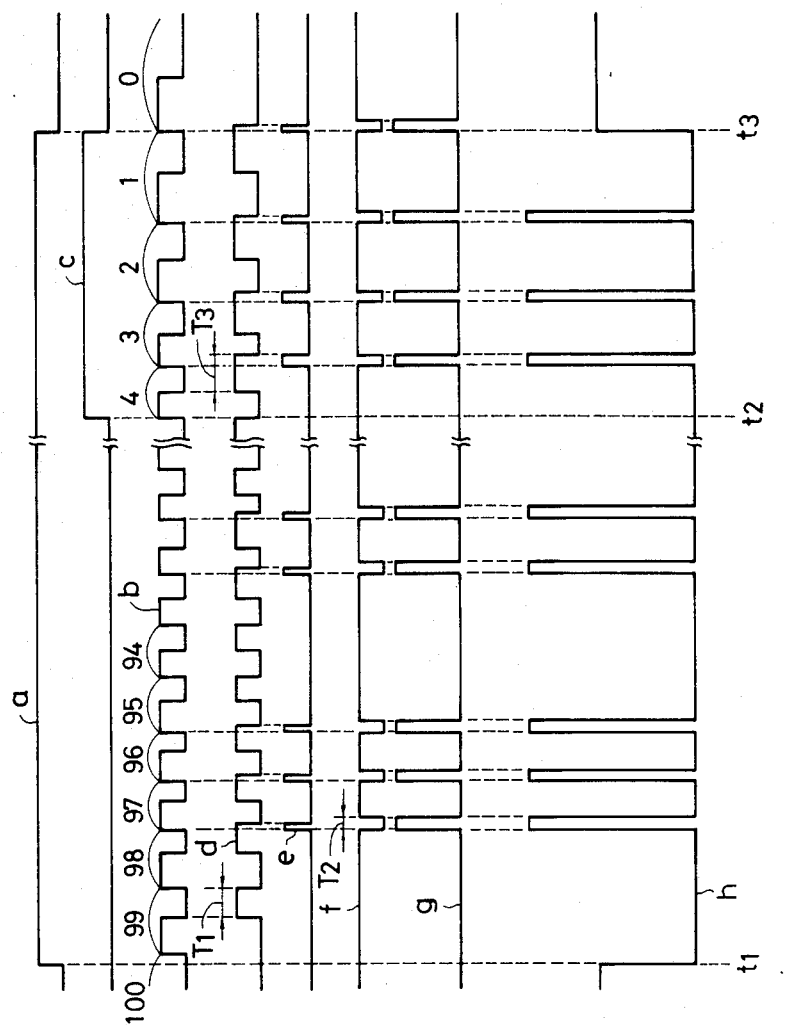
FIGS. 13(A) through 13(H) are waveform diagrams illustrating the operation of the device of FIG. 12.

In the above-described arrangement, when a jump instruction signal is produced from, for example, a high-speed-reproducing mode controlling circuit, the R-S flip-flop 29 is set in response and the Q output (a) of the flip-flop 29 is raised to high at the time instant $t_1$ as shown in FIG. 13(A). The high level signal (a) is supplied to the control input terminal of the loop switch 8 to open that switch and to activate the tracking servo loop.

Simultaneously, data N, e.g. "100" is preset to the counter 20. In this condition, the multivibrator 174 has not yet been reversed and the Q̄ output (f) maintains a high level condition as indicated in FIG. 13(F). Therefore, the Q output (a) of the R-S flip-flop 29 which is connected through the resistor $R_2$ to the second input terminal of the change over switch 175 appears in the output terminal of the change-over switch 175. Since the Q̄ output (g) of the multivibrator 174 is at a low level, the non-inverting input of the operational amplifier 176 is in a ground level. Thus, the operational amplifier 176 acts as an inversion amplifier which receives the Q output (a) as its input. The jump signal (h) outputted form the operational amplifier 176 becomes as shown in FIG. 13(H). The level of the jumping signal is lower than ground, and the mirror driving coil 13 is energized by the jump signal to move the data detecting light spot 2 in the radial direction towards the aimed track.

In accordance with the traversing of the recording tracks by the data detecting light spot 2, the on-track signal of low level is produced. The output (b) of the track detector 23 is as shown in FIG. 13(C). Every time when the on-track signal is absent, i.e. at every time when the level of the output (b) of the track detector 23 is raised, the counter 20 is counted down. Furthermore, evey time the on-track signal is present, i.e. at every time when the level of the output (b) of the track detector 23 is lowered, the multivibrator 171 is triggered and the Q output (d) thereof becomes high over a time period $T_1$ depending upon a time constant $C_1R_1$, as shown in FIG. 13(D).

When the relative moving velocity of the light spot with respect to the recording track is accelerated the duration that the output (b) is maintained at a low level becomes shorter than $T_1$. The output (e) of the three-input AND gate 172 assumes a high level while both the output (b) and the Q output (d) are at a high level, as shown in FIG. 13(E). When the output (e) is raised to a high level, the multivibrator 174 is triggered and the Q̄ output (f) goes to a low level over a predetermined period of time starting from the rising of the output (e), as shown in FIG. 13(F). The inverting input terminal of the operational amplifier 176 is grounded, and the operational amplifier 176 operates as a non-inversion amplifier with the aid of the resistor $R_3$ while receiving as its input the signal (g) of the multivibrator 174.

As shown in FIG. 13(G), the Q output of the multivibrator 174 assumes a high level over the period of time $T_2$ from the rising of the output (e). As a result, the jump signal (h) assumes a level higher than the ground level over the period of time $T_2$ from the rising of the output (e). The relative moving velocity of the light spot 2 is decelerated, and is controlled so as to be substantially equal to a predetermined velocity $V_1$.

When the light spot 2 is moved to a position within four recording tracks of the aimed track, the count value of the counter 20 becomes four (4). The four-track detection signal (c) is set to a high level as shown in FIG. 13(B), and the analog switch 173 is closed (time instant $t_2$). The inversion time period of the multivibrator 171 becomes $T_3$, which is longer than $T_1$ due to a time constant $(C_1+C_2)R_1$. Therefore, the relative moving velocity of the light spot 2 is controlled so as to be a constant value $V_2$ lower than the velocity $V_1$ after the time instant $t_2$.

When the light spot 2 has jumped the last recording track, the count value of the counter 20 is zero and the four-track detection signal (c) is discontinued (time instant $t_3$). Simultaneously therewith, the zero detection signal is outputted from the zero detection circuit 271 to reset the R-S flip-flop 29, with the result that the Q output (a) of the R-S flip-flop 29 assumes a low level. Accordingly, the jump signal (h) is zero and the tracking servo loop is closed with the data detecting light spot positioned on the aimed track.

Figure 14:
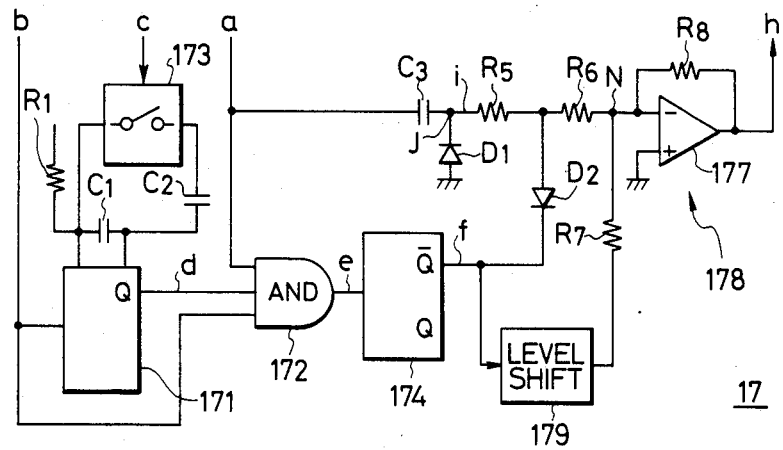
FIG. 14 is a partial circuit diagram showing a modification of the circuit of FIG. 12.

FIG. 14 is a block diagram showing a modified embodiment of the circuit shown in FIG. 12 in which only the jump signal generating circuit 17 is indicated and the reminder is similarly connected to the circuit of FIG. 12. Therefore, description of the similarly connected components is omitted herein.

In the embodiment of FIG. 14, the monostable multivibrators 171 and 174, three-input AND gate 172, analog switch 173, resistor $R_1$ and the capacitors $C_1$ and $C_2$ are identically connected as those of FIG. 12. However, while supplying the Q output of the R-S flip-flop 29 to one of three input terminals of the three-input AND gate 172 it is further supplied through a capacitor $C_3$ and a resistor $R_5$ to a node N. The node N is also connected to an adder 178 which includes an operational amplifier 177 and the resistors $R_6$ through $R_8$. The cathode of a diode $D_1$ is connected to a juncture point J of the capacitor $C_3$ and the resistor $R_5$. The anode of the diode $D_1$ is grounded. Further, the anode of a diode $D_2$ is connected to the node N through the resistor $R_6$. The cathode of the diode $D_2$ is connected to the $\overline{Q}$ output terminal of the multivibrator 174. The $\overline{Q}$ output (f) of the multivibrator 174 is connected to a level shift circuit 179 which operates to shift the $\overline{Q}$ output so that the output level of the circuit 179 is shifted to a ground level when the $\overline{Q}$ output (f) is in a higher level, while the output level thereof is shifted to a level lower than the ground level when the $\overline{Q}$ output (f) is in a low level. The output of the level shift circuit 179 is supplied to the node N and the output of the adder 178 is provided as the jump signal (h).

In the above-described arrangement, the Q output (a) of the R-S flip-flop 29, the four-track detection signal (c), the output (b) of the track detector 23, the Q output (d) of the multivibrator 171, the output (e) of the three-input AND gate 172, and the $\overline{Q}$ output (f) of the multivibrator 174 are as shown in FIGS. 15(A) through 15(F), respectively, and are also similar to the waveforms shown in FIGS. 13(A) through 13(F). When the $\overline{Q}$ output (f) is at high level during a period from time instants $t_1$ to $t_3$, the signal (i) (see FIG. 15(G)) appearing at the juncture point (J) of the capacitor $C_3$ and the resistor $R_5$ is maintained at a level substantially higher than the ground level. At this time, since the signal (i) is supplied to the adder 178 through the node N and the output signal of the level shift circuit 179, which is also supplied to the adder 178 through the node N, is at the ground level, the level of the signal (h) is lower than the ground level and the relative moving velocity of the light spot 2 is accelerated. Further, since one of the input terminals of the adder 178 is at the ground level of the output of the level shift circuit 179 is lower than the ground level when the $\overline{Q}$ output (f) becomes low level, the jump signal (h) becomes higher than the ground level. As a result, the relative moving velocity of the light spot 2 is decelerated and is controlled similar to the circuit in FIG. 12 so as to be a predetermined constant speed.

Figures 15A, 15B, 15C, 15D, 15E, 15F, 15G, 15H:
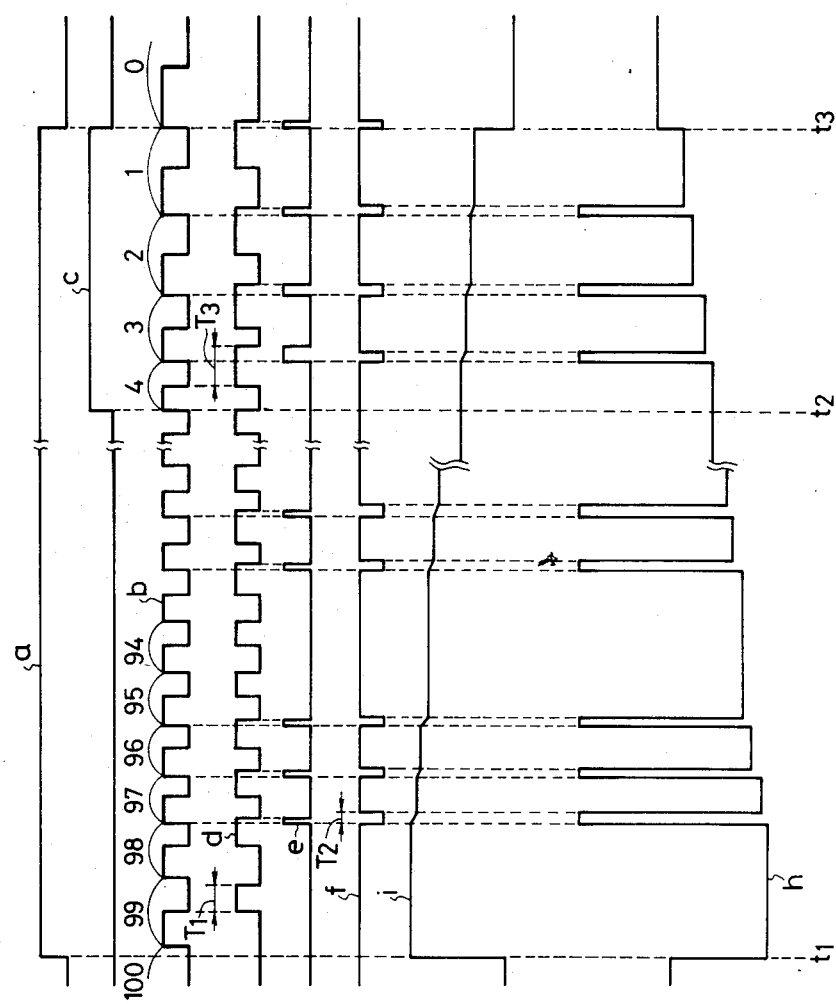
FIG. 15(A) through 15(H) are waveform diagrams illustrating the operation of the circuit of FIG. 14.

In the embodiment of FIG. 14, when the $\overline{Q}$ output (f) becomes low in level, negative electric charges are charged in the capacitor $C_3$ through the resistor $R_5$. Due to the charging of the capacitor $C_3$, the level of the signal appearing at the juncture point J is lowered in accordance with a time constant determined by the capacitor $C_3$ and the resistor $R_5$. Accordingly, the level of the jump signal (h) at the accelerating period gradually approaches the ground level as shown in FIG. 15(H). As the light spot 2 approaches the aimed track, the accleration force is gradually decreased, thereby facilitating the lock-in operation. As can be appreciated form the foregoing description, the embodiment of FIG. 14 is particularly suitable where the number of the tracks to be jumped is known, and the number thereof is relatively small.

Figure 16:
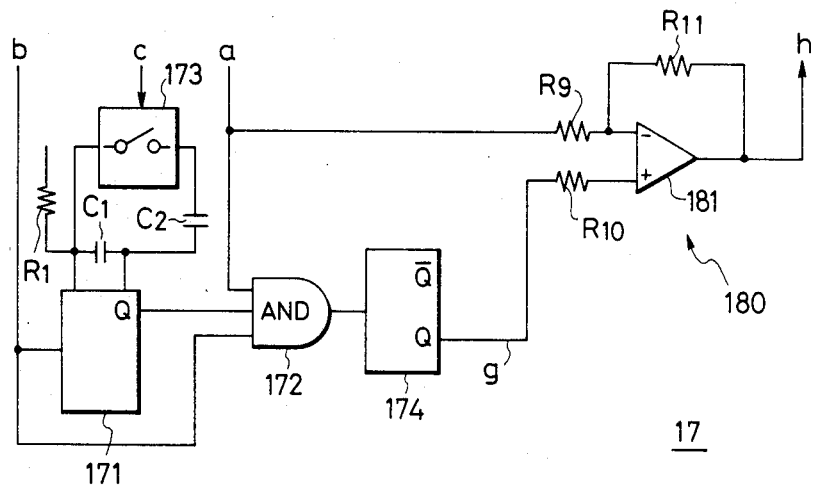
FIG. 16 is a partial circuit diagram showing a further modification of the circuit of FIG. 12.

FIG. 16 is a block diagram showing a further modified embodiment of the circuit in FIG. 12, in which only a specific circuit of the jump signal generating circuit 17 is shown and the remainder is omitted because of similar connection to those in FIG. 12. In the embodiment of Fig. 16, the Q output (a) of the R-S flip-flop 29 is supplied to one input terminal of the three-input AND gate 172 and further to the inverting input terminal of an amplifier 181 of addition/subtraction circuit 180 also include resistors $R_9$, $R_{10}$ and $R_{11}$. The Q output (g) of the multivibrator 174 is supplied to the noninverted input terminal of the circuit 180. The output of the addition/subtraction circuit 180 is provided as the jump signal (h).

In the above-described arrangement, the gain $A_1$ of the circuit 180 relative to the Q output (a) is $-R_{11}/R_9$, and the gain $A_2$ of the circuit 180 relative to the Q output (g) is $1+R_{11}/R_{10}$. Accordingly, with a condition of $R_9=R_{10}=R_{11}$, the gains $A_1$ and $A_2$ becomes $-1$ and 2, respectively. Thus, the jumps signal (h) similar to that obtained by the circuit of FIG. 12 is also obtainable, and the similar operation can be implemented. In this embodiment, the circuit structure is simplified, the number of the circuit components is reduced, the cost is reduced, and the reliability is enhanced.

In the foregoing various embodiments, it would be apparent that the counter 20 may be of the type having up and down counting input terminals. In such a case, the clock signals are fed to the up counting input terminal and the quasi-signal to the down counting input terminal. Although such counters are employed as a means for detecting a position of the light spot, a timer is also employable. In addition, the inversion time period of the multivibrator 174 has been described as being constant, it is possible that the inversion time period of the multivibrator could be varied depending upon the output of the counter 20. As a result a braking force to the relative moving velocity of the data detecting point is varied depending upon the relative position of the data detecting point with respect to the aimed track to stabilize the lock-in operation of the tracking servo.

It should be noted that according to the present invention, the track mirror may be replaced with various kinds of tracking means, such as an objective lens driver as described in U.S. Pat. No. 3,914,595, or a tubular player arm as described in U.S. Pat. No. 3,969,574. Such tracking means travel along a radial direction of the recording disk. An example of the tracking means acting as a coarse adjustement means is described, for example, in U.S. Pat. No. 4,037,252.

It should further be noted that the four-track detection circuit may be replaced with an M-track detection circuit provided that M is relatively small number.

Although description has been made with respect to an optical type data reproducing device, the present invention is also applicable to an electrostatic capacitance type data reproducing device.

As described, according to the present invention, since the detection of the number of the over-run tracks can be accurately carried out, it is possible to jump the data detecting point accurately onto the aimed track. With the device shown in FIG. 12, the tracking servo can be performed in a stable manner after the jumping operation has ceased. Further, the time required for the jumping operation can be made constant.

What is claimed is;

1. A device for causing a data detecting spot to move a preset number of tracks on a data recording disc having a plurality of tracks from an initial track at which said data detecting spot is initially positioned to an aimed track, said device comprising:

moving means for selectively causing said data detecting spot to move in a forward or reverse direction in response to positioning signals;

a counter for storing a track value representing the number of recording tracks between a current track at which said data detecting spot is directed and said aimed track;

means for initially setting said counter to said preset number of tracks;

means, coupled to said counter and to said moving means, for generating said positioning signals to cause said moving means to move said data detecting spot in a forward direction toward said aimed track by a distance corresponding to the track value stored in said counter;

means for generating a track signal each time said data detecting spot traverses one of said plurality of tracks;

means for decrementing said counter is response to said track signal;

detecting means, coupled to said track signal generating means and to said counter, for detecting that said data detecting spot has been moved by said moving means in a forward direction to a track beyond said aimed track, said detecting means including means for causing said counter to store a track value corresponding to an over-run number of tracks representing the number of additional tracks on said data recording disc which said data detecting spot traversed after traversing said aimed track; and means, coupled to said detecting means, for causing said positioning signal generating means to generate positioning signals to cause said moving means to move said data detecting spot in a reverse direction back toward said aimed track by a distance corresponding to said over-run number of tracks.

2. A device according to claim 1 wherein said detecting means comprises:

a return detection circuit for reversing the counting direction of said counter in response to the detection of the reversal in direction of said data detecting spot movement by said detecting means; and a quasi-signal counter generation circuit for supplying a count signal to said counter in response to each track signal generated after the counting direction of said counter has been reversed by said return detection circuit.

3. A device according to claim 2 further including a judgment circuit connected to said counter and to said positioning signal generating means for terminating the generation of said positioning signals responsive to said storing a zero value.

4. A device according to claim 2 wherein said positioning signals generating means comprises a jump signal generating circuit for generating said positioning signals at a first frequency when the value stored in said counter is greater than a preselected track value indicating that the data detecting spot is within a predetermined number of tracks from aimed track, and for generating said positioning signals at a second frequency, less than said first frequency, when the track value stored in said counter is less than or equal to said preselected track value.

5. A device according to claim 4 further including a count content judging circuit coupled to said counter and to said jump signal generating circuit for controlling said jump signal generating circuit to generate said positioning signals at said first frequency when the value stored in said counter is greater than said preselected track value and to generate said positioning signals at said second frequency when said track value stored in said counter is less than or equal to said preselected track value.

6. A device according to claim 2 wherein said positioning signals generating means comprises a jump signal generating circuit coupled to said counter for generating said positioning signals at a decreasing rate as the track value in said counter decreases indicating that said data detecting spot approaches said aimed track.

* * * * *